University States Patent  
Kuroki et al.

(10) Patent No.: US 9,421,977 B2  
(45) Date of Patent: Aug. 23, 2016

(54) VEHICLE DRIVE CONTROLLER (71) Applicants: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(72) Inventors: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/439,366

(22) PCT Filed: Oct. 31, 2012

(86) PCT No.: PCT/JP2012/078231  
§ 371 (c)(1),  
(2) Date: Apr. 29, 2015

(87) PCT Pub. No.: WO2014/068723  
PCT Pub. Date: May 8, 2014

(65) Prior Publication Data  
US 2015/0266480 A1    Sep. 24, 2015

(51) Int. Cl.  
*B60W 10/02* (2006.01)  
*B60W 30/18* (2012.01)  
(Continued)

(52) U.S. Cl.  
CPC ......... *B60W 30/18072* (2013.01); *B60W 10/02* (2013.01); *B60W 10/04* (2013.01); *B60W 10/06* (2013.01); *B60W 10/10* (2013.01); *B60W 30/182* (2013.01); *B60W 30/18136* (2013.01);  
(Continued)

(58) Field of Classification Search  
None  
See application file for complete search history.

(56) References Cited

U.S. PATENT DOCUMENTS 9,267,448 B2 * 2/2016 Kuroki ............... F02D 1/0087  
2015/0166066 A1 * 6/2015 Suzuki ............... F02N 11/0833  
477/174

(Continued)

FOREIGN PATENT DOCUMENTS

JP    2002-227885 A    8/2002

OTHER PUBLICATIONS

International Search Report issued Dec. 4, 2012, in PCT/JP2012/078231, filed Oct. 31, 2012.

*Primary Examiner* — Dirk Wright  
(74) *Attorney, Agent, or Firm* — Oblon, McClelland, Maier & Neustadt, L.L.P.

(57) ABSTRACT

A running control device is configured to execute an engine coupling running mode performed with an engine and wheels connected by a connecting/disconnecting device, a neutral inertia running mode performed with the engine separated from the wheels by the connecting/disconnecting device while the engine is supplied with fuel and allowed to perform self-sustaining rotation, and a free-run inertia running mode performed with the engine separated from the wheels by the connecting/disconnecting device while fuel supply to the engine is stopped to stop rotation. The neutral inertia running mode is terminated when an operation amount of the accelerator pedal becomes equal to or greater than a predefined first determination value. The free-run inertia running mode is terminated when an operation amount of the accelerator pedal becomes equal to or greater than a predefined second determination value larger than the first determination value.

2 Claims, 6 Drawing Sheets (51) Int. Cl.
  *F02D 41/04* (2006.01)
  *F02D 41/12* (2006.01)
  *F02N 11/08* (2006.01)
  *B60W 10/06* (2006.01)
  *B60W 10/10* (2012.01)
  *B60W 30/182* (2012.01)
  *B60W 10/04* (2006.01)
  *F16D 48/06* (2006.01)

(52) U.S. Cl.
  CPC .............. *F02D41/045* (2013.01); *F02D 41/12* (2013.01); *F02D 41/123* (2013.01); *F02N 11/0822* (2013.01); *F16D 48/06* (2013.01); *B60W 2030/1809* (2013.01); *B60W 2030/18081* (2013.01); *B60W 2540/10* (2013.01); *B60W 2540/103* (2013.01); *F02D 2200/602* (2013.01); *F02N 2200/101* (2013.01); *F16D 2500/31453* (2013.01); *F16D 2500/5085* (2013.01); *F16D 2500/50676* (2013.01); *F16D 2500/50858* (2013.01); *F16D 2500/7105* (2013.01); *Y02T 10/48* (2013.01); *Y10T 477/75* (2015.01)

(56) References Cited

U.S. PATENT DOCUMENTS

2015/0291171 A1* 10/2015 Kuroki .................... F02D 41/12
  701/70
2015/0307102 A1* 10/2015 Mitsuyasu ...... B60W 30/18172
  701/48
2015/0307103 A1* 10/2015 Kuroki .................... F16H 61/21
  701/70

* cited by examiner

| RUNNING MODE | ENGINE 12 | CLUCH C1 | ENGINE BRAKE FORCE | FUEL CONSUMPTION |
|---|---|---|---|---|
| FREE-RUN INERTIA RUNNING | F/C; ROTATION STOP | RELEASED | SMALL | ◎ |
| NEUTRAL INERTIA RUNNING | IDLE ROTATION | RELEASED | SMALL | ○ |

VEHICLE DRIVE CONTROLLER

TECHNICAL FIELD

The present invention relates to a running control device of a vehicle and particularly to the control when a return to a normal engine coupling running mode is made in accordance with an operation of an accelerator pedal during an inertia running mode.

BACKGROUND ART

With regard to an engine brake running mode performed with engine brake applied by driven rotation of an engine while the engine and wheels are kept connected, an inertia running mode is conceived that is performed with an engine brake force reduced by separating the engine from the wheels by a connecting/disconnecting device for extending a running distance and improving fuel consumption. A device described in Patent Document 1 is an example thereof and, two types of the inertia running mode are proposed as (a) a neutral inertia running mode performed with the engine separated from the wheels by a clutch (the connecting/disconnecting device) while the engine is supplied with fuel and allowed to perform self-sustaining rotation, and (b) a free-run inertia running mode performed with the engine separated from the wheels by the clutch while the fuel supply to the engine is stopped to stop the rotation. Either of these types of the inertia running modes is performed under a certain condition without particular distinction.

PRIOR ART DOCUMENT

Patent Document

Patent Document 1: Japanese Laid-Open Patent Publication No. 2002-227885

SUMMARY OF THE INVENTION

Problem to Be Solved by the Invention

In the Patent Document 1, it is described that the inertia running mode is terminated when an operation amount of an accelerator pedal becomes equal to or greater than a predetermined value, and the inertia running mode is canceled without distinction between the two types of the inertia running modes. However, since the state of the engine is different between the neutral inertia running mode and the free-run inertia running mode, a driver has different expectations to reacceleration performance and fuel-consumption improving performance. In particular, since the engine performs self-sustaining rotation in an idling state etc. in the neutral inertia running mode and this is recognizable for the driver from sound, vibration, display, etc., the driver expects or predicts that a desired drive force is promptly acquired in accordance with an output request made by an accelerator operation. In contrast, since the rotation of the engine is stopped in the free-run inertia running mode and this is recognizable for the driver from the presence/absence of sound and vibration, display, etc., the driver does not expect that the drive force can immediately be acquired by a slight accelerator pedal operation, feels that a large accelerator operation is necessary if reacceleration is really desired, and is considered to have high expectation to fuel consumption improvement.

Therefore, if a termination condition is set such that the inertia running mode is terminated by a small accelerator pedal operation amount, a return from the inertia running mode to the engine coupling running mode is made by a slight accelerator operation in the case of the free-run inertia running mode in which the rotation of the engine is stopped, and the fuel-consumption improving performance expected by the driver cannot sufficiently be acquired. Particularly, when the engine is started in accordance with the return to the engine coupling running mode, a large amount of fuel is temporarily needed along with occurrence of vibration and noise and, therefore, if ON (execution) and OFF (termination) of the inertia running mode are repeated depending on the presence/absence of the accelerator operation etc., and the start and stop of the engine are accordingly repeated in a short time, fuel consumption and riding comfort are deteriorated. On the other hand, if the accelerator pedal operation amount for terminating the inertia running mode is set larger, a return to the engine coupling running mode is not easily made regardless of the accelerator operation in the case of the neutral inertia running mode in which the engine performs the self-sustaining rotation, and the driver's expectation to the reacceleration performance cannot be met.

The present invention was conceived in view of the situations and it is therefore an object of the present invention to, when a neutral inertia running mode and a free-run inertia running mode are two types of performable inertia running modes and the inertia running mode is terminated in accordance with an accelerator operation, enable the types of the inertia running modes to be properly terminated depending on a difference between an expectation to reacceleration performance from an accelerator operation and an expectation to fuel consumption improvement.

Means for Solving the Problem

To achieve the object, the first aspect of the invention provides (a) a running control device of a vehicle including an engine, an accelerator pedal, and a connecting/disconnecting device connecting/disconnecting the engine and wheels, the running control device of a vehicle being configured to execute (b) an engine coupling running mode performed with the engine and the wheels connected by the connecting/disconnecting device, (c) a neutral inertia running mode performed with the engine separated from the wheels by the connecting/disconnecting device while the engine is supplied with fuel and allowed to perform self-sustaining rotation, and (d) a free-run inertia running mode performed with the engine separated from the wheels by the connecting/disconnecting device while fuel supply to the engine is stopped to stop rotation, (e) the neutral inertia running mode being terminated when an operation amount of the accelerator pedal becomes equal to or greater than a predefined first determination value α while the neutral inertia running mode is performed, (f) the free-run inertia running mode being terminated when an operation amount of the accelerator pedal becomes equal to or greater than a predefined second determination value β larger than the first determination value α while the free-run inertia running mode is performed.

The second aspect of the invention provides the running control device of a vehicle recited in the first aspect of the invention, wherein (a) a return to the engine coupling running mode is made when an operation amount of the accelerator pedal becomes equal to or greater than the first determination value α while the neutral inertia running mode is performed, and wherein (b) a return to the engine coupling running mode is made when an operation amount of the accelerator pedal becomes equal to or greater than the second determination value β while the free-run inertia running mode is performed.

Effects of the Invention

The vehicle drive device as described above can perform as the inertia running mode both the neutral inertia running mode performed with the engine allowed to perform the self-sustaining rotation and the free-run inertia running mode performed with the rotation of the engine stopped by stopping the fuel supply and, since the neutral inertia running mode is terminated when the operation amount of the accelerator pedal becomes equal to or greater than the relatively small first determination value α. Since the engine performs the self-sustaining rotation in the neutral inertia running mode, a driver expects that a desired drive force is promptly acquired in accordance with an accelerator operation, and the reacceleration performance as expected by the driver is acquired by terminating the inertia running mode when the operation amount of the accelerator pedal becomes equal to or greater than the relatively small first determination value α so that the return to the engine coupling running mode is promptly made. Particularly, since the return to the engine coupling running mode can be made simply by connecting the connecting/disconnecting device, this leads to the excellent responsiveness until acquisition of a drive force from engine output, which matches the user's expectation to reacceleration performance. Since the engine performs self-sustaining rotation in the neutral inertia running mode, even if ON (execution) and OFF (termination) of the neutral inertia running mode are repeated depending on the presence/absence of the accelerator operation etc., the engine is maintained in the self-sustaining rotation state without the risk of deterioration of fuel consumption and riding comfort.

On the other hand, although the execution of the free-run inertia running mode performed with the rotation of the engine stopped is maintained until the operation amount of the accelerator pedal reaches the relatively large second determination value β, Since the engine is stopped in the free-run inertia running mode, the driver expects the improvement in the fuel-consumption and does not expect much of the reacceleration performance, and even if the free-run inertia running mode is maintained until the second determination value β, the driver is less likely to have a feeling of strangeness and the fuel-consumption improving performance is acquired as expected by the driver. Particularly, since the fuel supply to the engine is stopped in the free-run inertia running mode, the fuel consumption can significantly be improved by maintaining the free-run inertia running mode until reaching the relatively large second determination value β.

In other words, since the neutral inertia running mode with the engine allowed to perform the self-sustaining rotation is terminated when the operation amount of the accelerator pedal becomes equal to or greater than the relatively small first determination value α and the free-run inertia running mode with the rotation of the engine stopped is terminated when the operation amount of the accelerator pedal becomes equal to or greater than the relatively large second determination value β, the driver's expectations to both the reacceleration performance and the fuel-consumption improving performance can be satisfied.

In the second aspect of the invention, since a return to the engine coupling running mode is made when an operation amount of the accelerator pedal becomes equal to or greater than the first determination value α while the neutral inertia running mode is performed, an output request made by a driver's accelerator operation can be met properly. Since a return to the engine coupling running mode is made when an operation amount of the accelerator pedal becomes equal to or greater than the second determination value β while the free-run inertia running mode is performed, a driver's output request can be met properly while ensuring the fuel-consumption improving performance.

MODE FOR CARRYING OUT THE INVENTION

An example of the present invention will now be described in detail with reference to the drawings.

Figure 1:
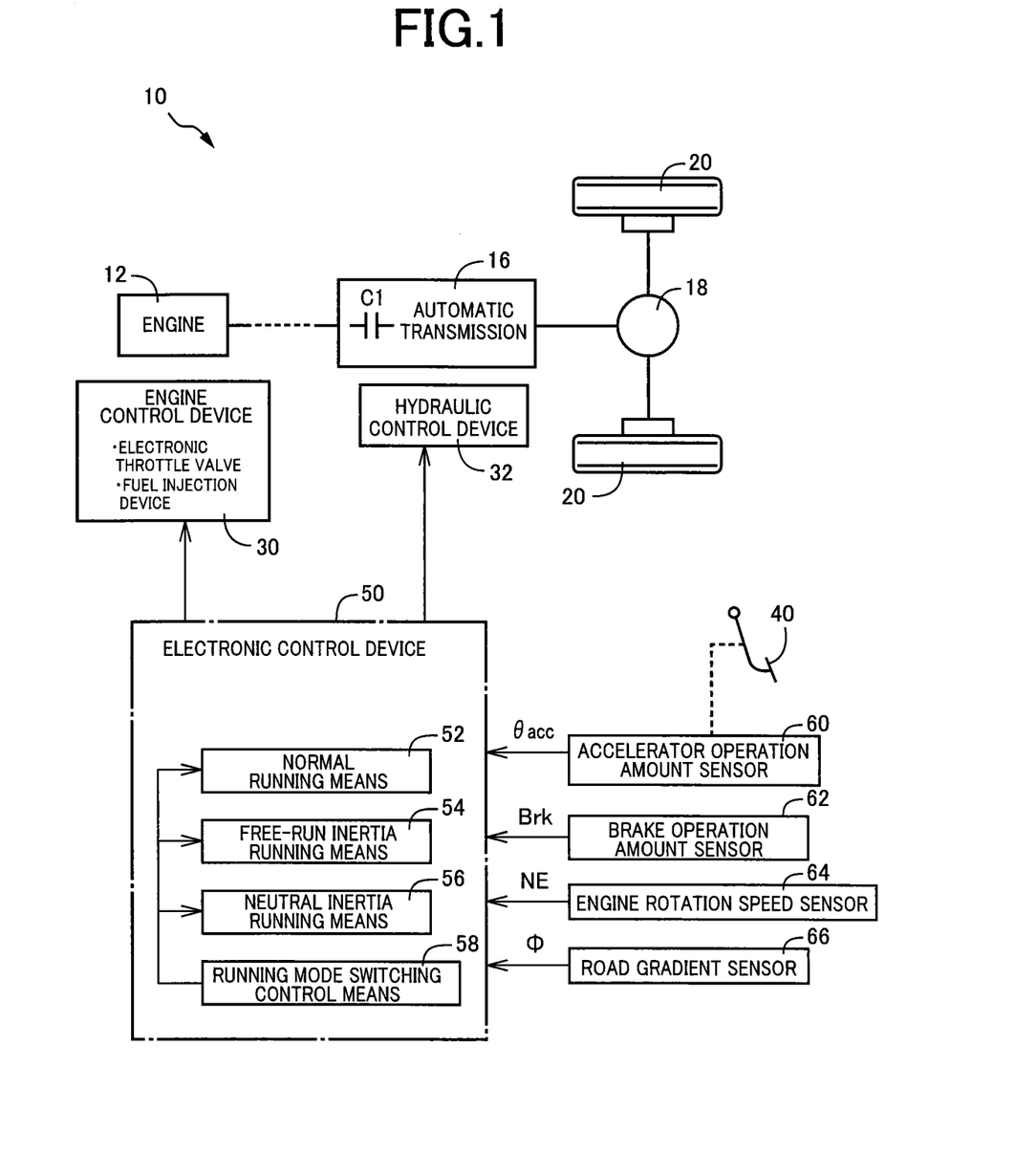
FIG. 1 is a schematic configuration diagram including a schematic of a vehicle drive device to which the present invention is preferably applied along with a main portion of a control system.

FIG. 1 is a schematic configuration diagram including a schematic of a vehicle drive device 10 to which the present invention is preferably applied along with a main portion of a control system. The vehicle drive device 10 includes as a drive force source an engine 12 that is an internal combustion engine such as a gasoline engine and a diesel engine generating power from combustion of fuel, and the output of the engine 12 is transmitted from an automatic transmission 16 via a differential gear device 18 to left and right wheels 20. A damper device and a power transmission device such as a torque converter are disposed between the engine 12 and the automatic transmission 16, and a motor generator acting as a drive force source can also be disposed therebetween.

The engine 12 includes an engine control device 30 having various pieces of equipment necessary for output control of the engine 12, such as an electronic throttle valve and a fuel injection device. The electronic throttle valve and the fuel injection device control an intake air amount and a fuel supply amount, respectively, and are basically controlled depending on an operation amount of an accelerator pedal 40 (an accelerator operation amount) θacc that is an output request amount of a driver. The fuel injection device can stop the fuel supply (perform a fuel cut F/C) at the time of acceleration-off when the accelerator operation amount θacc is zero even during running of the vehicle.

The automatic transmission 16 is a stepped automatic transmission of a planetary gear type etc., having a plurality of gear stages with different gear ratios e established depending on engaged/released states of a plurality of hydraulic friction engagement devices (clutches and brakes) and is subjected to shift control by electromagnetic hydraulic control valves, switching valves, etc. disposed in a hydraulic control device 32. A clutch C1 is a friction engagement devices acting as an input clutch of the automatic transmission 16 and is also subjected to engagement/release control by the hydraulic control device 32. The clutch C1 corresponds to a connecting/disconnecting device connecting and disconnecting the engine 12 and the wheels 20. The automatic transmission 16 may be implemented by using a continuously variable transmission of a belt type etc., instead of a stepped transmission.

The vehicle drive device 10 configured as described above includes an electronic control device 50. The electronic control device 50 includes a so-called microcomputer having a CPU, a ROM, a RAM, an I/O interface, etc., to execute signal processes in accordance with a program stored in advance in the ROM, while utilizing a temporary storage function of the RAM. The electronic control device 50 is supplied with a signal indicative of the operation amount of the accelerator pedal 40 (accelerator operation amount) θacc from an accelerator operation amount sensor 60 and is supplied with a signal indicative of the operation amount of the brake pedal not shown (brake operation force) Brk from a brake operation amount sensor 62. The electronic control device 50 is also supplied with a signal indicative of a rotation speed (engine rotation speed) NE of the engine 12 from an engine rotation speed sensor 64 and a signal indicative of a road surface gradient Φ from a road surface gradient sensor 66. Other various pieces of information necessary for various controls are also supplied. Although the road surface gradient sensor 66 is a G (acceleration) sensor, the road surface gradient Φ can also be obtained by a calculation from the output of the engine 12 and a change in the vehicle speed V. The accelerator operation amount θacc corresponds to an output request amount of a driver and the accelerator pedal 40 corresponds to an output request operation member.

The electronic control device 50 functionally includes a normal running means 52, a free-run inertia running means 54, a neutral inertia running means 56, and a running mode switching control means 58. The normal running means 52 performs a normal running mode performed in a power transmission state in which the clutch C1 is engaged to connect the engine 12 and the wheels 20 via the automatic transmission 16, and can perform an engine drive running mode performed by operating the engine 12 in accordance with the accelerator operation amount θacc as well as an engine brake running mode in which the engine 12 is driven to rotate in accordance with the vehicle speed V in an idle state or in a fuel cut (F/C) state in which fuel supply is stopped. The normal running mode corresponds to an engine coupling running mode.

Figure 2:
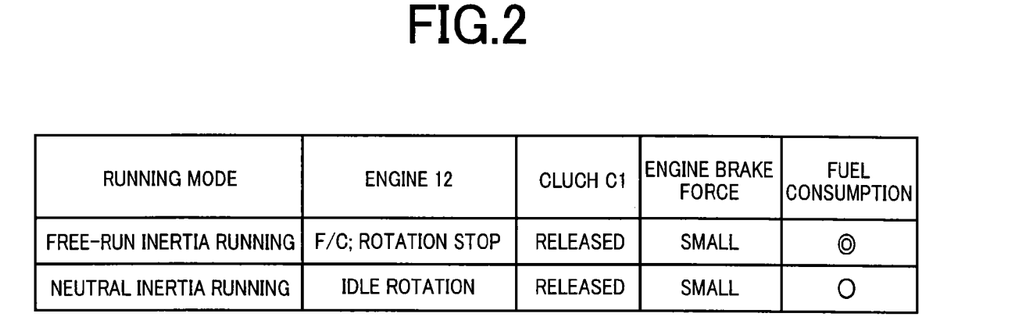
FIG. 2 is a diagram for explaining two types of inertia running modes performed by the vehicle drive device of FIG. 1.

The free-run inertia running means 54 and the neutral inertia running means 56 are for the purpose of performing two respective types of running modes depicted in FIG. 2 and the free-run inertia running means 54 performs a free-run inertia running mode. The free-run inertia running mode is performed by releasing the clutch C1 to separate the engine 12 from the wheels 20 while a fuel cut F/C is performed to stop the fuel supply to the engine 12 so that rotation of the engine 12 is stopped. In this case, since the release of the clutch C1 results in the engine brake force of substantially zero, a reduction in running resistance extends the running distance of the inertia running mode, and since the fuel supply to the engine 12 is stopped, fuel consumption can significantly be improved.

The neutral inertia running means 56 performs a neutral inertia running mode. The neutral inertia running mode is performed by releasing the clutch C1 to separate the engine 12 from the wheels 20 while a minimum amount of fuel is supplied to allow the engine 12 to operate in the idle state. Also in this case, since the release of the clutch C1 results in the engine brake force of substantially zero, a reduction in running resistance extends the running distance of the inertia running mode and fuel consumption can be improved. Although fuel is consumed by operating the engine 12 in the idle state, since the distance of the inertia running mode becomes longer and a frequency of reacceleration is reduced as compared to a normal engine brake running mode in which the engine 12 is connected to the wheels 20, overall fuel consumption is improved.

The running mode switching control means 58 switches three running modes of the normal running mode, the free-run inertia running mode, and the neutral inertia running mode and starts execution of the free-run inertia running mode or the neutral inertia running mode in accordance with a predefined inertia running mode execution start condition. The inertia running mode execution start condition is defined such that the execution of the free-run inertia running mode or the neutral inertia running mode is started if a state of the accelerator operation amount θacc of substantially zero, i.e., accelerator-off (non-operation), and the brake operation force Brk of substantially zero, i.e., brake-off (non-operation), continues for a predetermined time period or longer, for example. Other execution start conditions may also be defined, including the vehicle speed V equal to or less than a predetermined value, a down-gradient of a road surface equal to or less than a predetermined value (on the flat side), and an inter-vehicle distance to a preceding vehicle equal to or greater than a predetermined value.

With regard to individual cases of starting the execution of the neutral inertia running mode and the free-run inertia running mode, for example, since electricity can be generated by an alternator etc. from the rotation of the engine 12 in the neutral inertia running mode, the neutral inertia running mode can be defined to be performed depending on a necessity of electric energy such as when a battery remaining amount is equal to or less than a predetermined amount. The neutral inertia running mode can be defined to be performed for warm-up also when an engine water temperature is equal to or less than a predetermined temperature. If an oil pump is mechanically driven in accordance with engine rotation, the neutral inertia running mode can be defined to be performed depending on a necessity of an oil pressure. If a brake booster is included that amplifies a brake force with a negative pressure from the engine rotation, the neutral inertia running mode can be defined to be performed depending on a necessity of the negative pressure such as when a large braking force is likely to be required on a road surface with a down-gradient or at high vehicle speed, and other various forms are also available.

Figure 3:
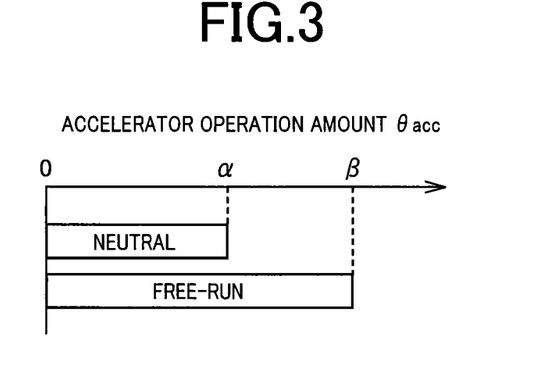
FIG. 3 is a diagram for indicating a difference between execution allowable ranges (upper limit values) of free-run inertia running mode and neutral inertia running mode performed by the vehicle drive device of FIG. 1 related to the accelerator operation amount θacc.

On the other hand, a termination condition of terminating the inertia running mode and returning to the normal running mode is defined to include at least the accelerator operation amount θacc. FIG. 3 is a diagram of exemplification of execution allowable ranges (upper limit values) of the respective types of the inertia running modes related to the accelerator operation amount θacc, and the neutral inertia running mode is terminated when the accelerator operation amount θacc becomes equal to or greater than a relatively small first determination value α defined in advance. In particular, since the engine 12 performs the self-sustaining rotation in the neutral inertia running mode, a driver expects that a desired drive force is promptly acquired in accordance with an output request made by an accelerator operation, and the reacceleration performance as expected by the driver is acquired by terminating the inertia running mode when the accelerator operation amount θacc becomes equal to or greater than the relatively small first determination value α so that the return to the normal running mode is promptly made.

The execution of the free-run inertia running mode performed with the rotation of the engine 12 stopped is maintained until the accelerator operation amount θacc reaches the relatively large second determination value β. Since the rotation of the engine 12 is stopped in the free-run inertia running mode, the driver expects the fuel-consumption improving effect and does not expect much of the responsiveness of the drive force to the accelerator operation, i.e., the reacceleration performance, and even if the free-run inertia running mode is maintained until the second determination value β larger than the first determination value α, the driver is less likely to have a feeling of strangeness and the fuel-consumption improving performance is acquired as expected by the driver. Particularly, since the fuel supply to the engine 12 is stopped in the free-run inertia running mode, the fuel consumption can significantly be improved by maintaining the free-run inertia running mode until reaching the relatively large second determination value β.

Figure 4:
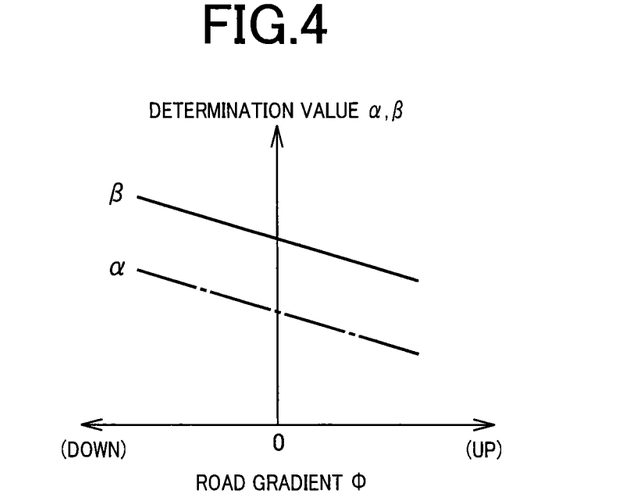
FIG. 4 is a diagram for indicating an example of a data map when determination values α, β of FIG. 3 are set depending on the road surface gradient Φ.

The determination values α and β may be defined as constant values in advance or may be set by using the road gradient Φ as a parameter as depicted in FIG. 4, for example. In particular, since the vehicle tends to accelerate on a downslope when the road surface gradient Φ is negative, the driver has low expectations for the drive force responsiveness to an output request made by an accelerator operation as compared to a substantially horizontal flat road (Φ≈0), and the fuel consumption can further be improved by making the determination values α and β larger to maintain the inertia running mode as long as possible. In contrast, since the vehicle tends to decelerate on an up-slope when the road surface gradient Φ is positive, the driver has high expectations for the drive force responsiveness to an output request made by an accelerator operation as compared to a substantially horizontal flat road (Φ≈0), and the determination values α and β are made smaller to narrow the execution range of the inertia running mode so that a return to the normal running mode is promptly made to acquire the drive force of the engine 12. The determination values α and β as described above are defined in advance from a data map, a computing equation, etc.

The termination condition may be defined to include at least the accelerator operation amount θacc, and the inertia running mode can be terminated based on a condition other than the accelerator operation amount θacc.

Figure 5:
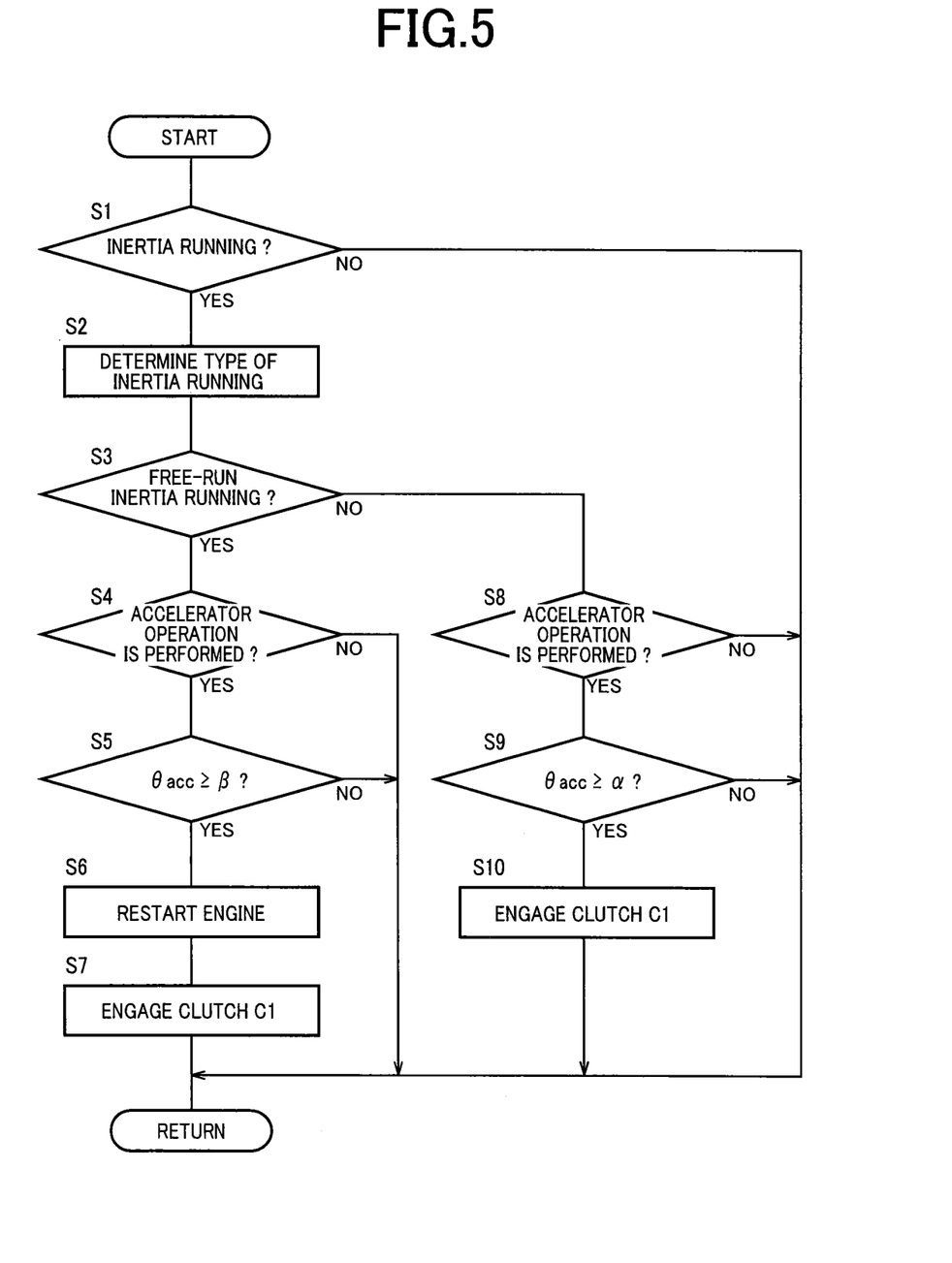
FIG. 5 is a flowchart for explaining an operation when a running mode switching control means of FIG. 1 performs termination control of the inertia running mode.

FIG. 5 is a flowchart for explaining an operation when the running mode switching control means 58 makes a termination determination of the free-run inertia running mode and the neutral inertia running mode for making a return to the normal running mode. At step S1, it is determined whether any of the free-run inertia running mode and the neutral inertia running mode is being performed and, if any inertia running mode is being performed, a type of the inertia running mode is determined at step S2. The determinations on whether the inertia running mode is being performed and the type of the inertia running mode may be made from the state of the engine 12 and the state of the clutch C1 depicted in FIG. 2, for example, or may be made from a flag etc. indicative of a type of the inertia running mode. At step S3, the individual case is determined based on whether the inertia running mode is the free-run inertia running mode and, the process from step S4 is performed in the case of the free-run inertia running mode, or the process from step S8 is executed in the case of the neutral inertia running mode.

At step S4, it is determined whether an accelerator operation is performed, based on the accelerator operation amount θacc etc., and if an accelerator operation is not performed, the process is terminated to repeat from step S1, or if an accelerator operation is performed, step S5 is executed. At step S5, it is determined whether the accelerator operation amount θacc is equal to or greater than the second determination value β and, if θacc<β is satisfied, the process is terminated, or if θacc≥β is satisfied, the engine 12 is restarted at step S6 and the clutch C1 is engaged at step S7 to terminate the free-run inertia running mode and return to the normal running mode.

Figure 6:
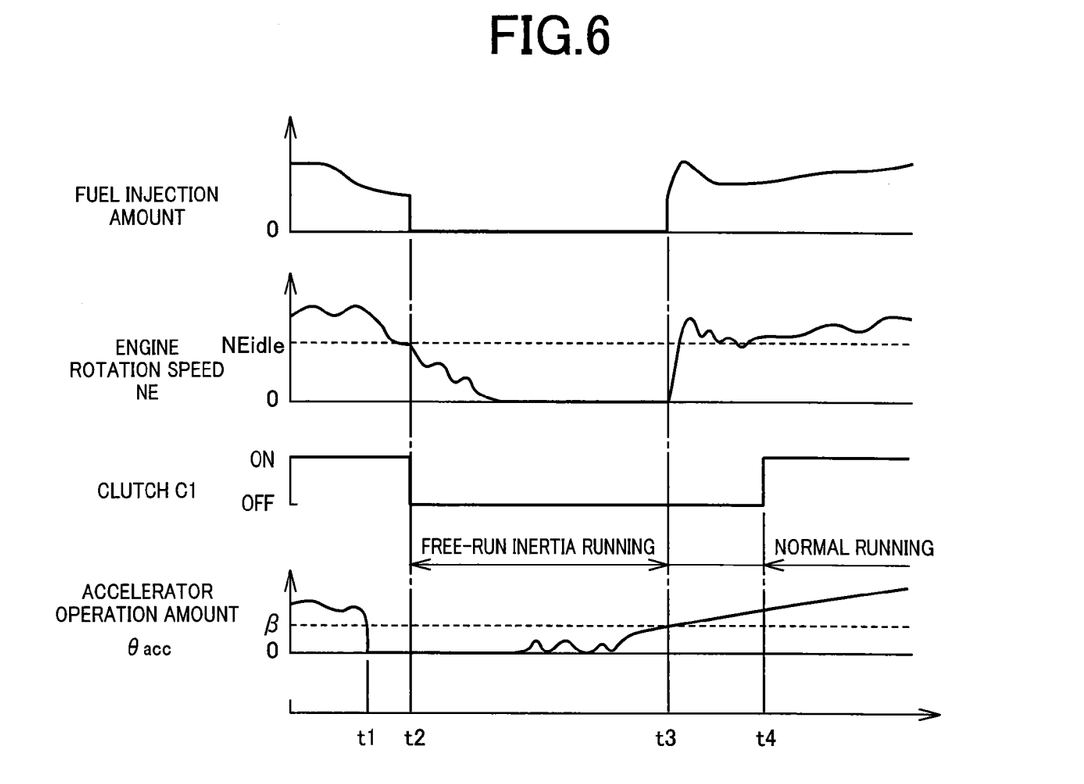
FIG. 6 is an example of a time chart of changes in operation states of the portions when the return from the free-run inertia running mode to the normal running mode is made in accordance with the flowchart of FIG. 5.

FIG. 6 is an example of a time chart of changes in operation states of the portions when the determination of step S5 becomes YES (affirmative) because of reoperation of the accelerator pedal 40 during execution of the free-run inertia running mode and the engine 12 is restarted to return to the normal running mode. Time t1 is the time of accelerator-off and, after a certain time has elapsed (at time t2), the clutch C1 is released (OFF) and a fuel cut is performed to start the free-run inertia running mode. Time t3 is the time when the accelerator operation amount θacc becomes equal to or greater than the second determination value β and the determination of step S5 becomes YES (affirmative) to restart the engine 12. When the engine rotation speed NE becomes substantially stable at around an idle rotation speed NEidle (time t4), the clutch C1 is engaged (ON) to return to the normal running mode. Subsequently, the output of the engine 12 is controlled in accordance with the accelerator operation amount θacc as is the case with the normal engine drive running mode.

Returning to FIG. 5, if the determination of step S3 is NO (negative), i.e., if the neutral inertia running mode is being performed, it is determined at step S8 whether an accelerator operation is performed, based on the accelerator operation amount θacc etc. If an accelerator operation is not performed, the process is terminated to repeat from step S1, or if an accelerator operation is performed, step S9 is executed. At step S9, it is determined whether the accelerator operation amount θacc is equal to or greater than the first determination value α and, if θacc<α is satisfied, the process is terminated, or if θacc≥α is satisfied, the clutch C1 is engaged at step S10 to terminate the neutral inertia running mode and return to the normal running mode.

Figure 7:
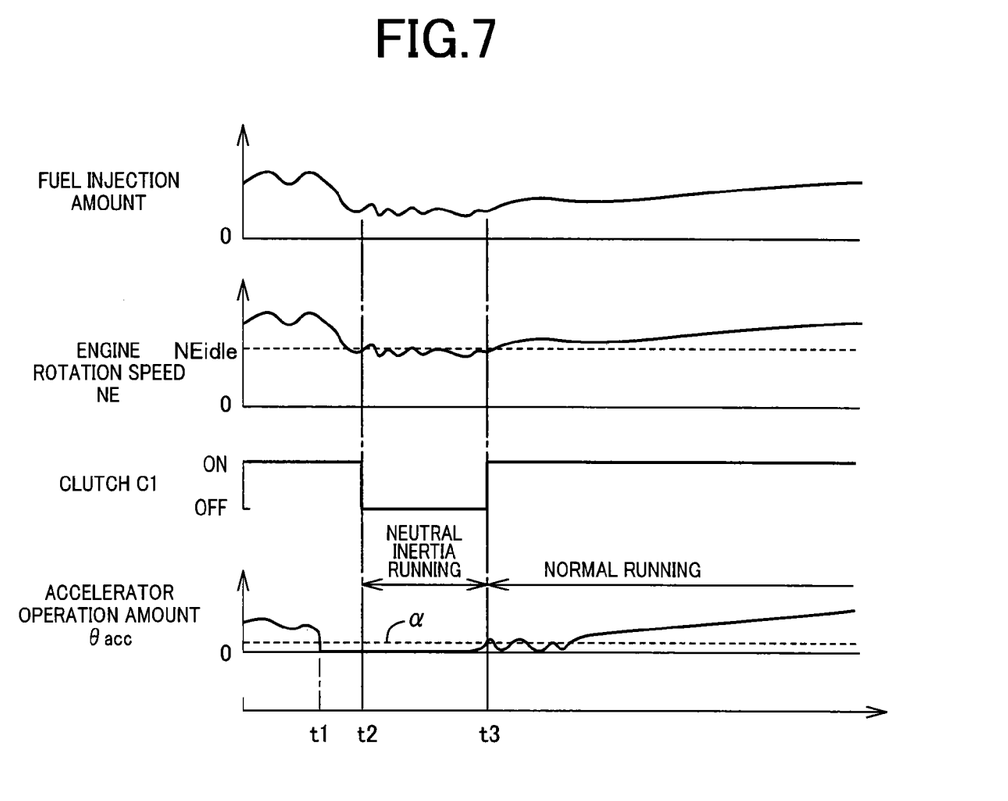
FIG. 7 is an example of a time chart of changes in operation states of the portions when the return from the neutral inertia running mode to the normal running mode is made in accordance with the flowchart of FIG. 5.

FIG. 7 is an example of a time chart of changes in operation states of the portions when the determination of step S9 becomes YES because of reoperation of the accelerator pedal 40 during execution of the neutral inertia running mode and the clutch C1 is engaged to return to the normal running mode. Time t1 is the time of accelerator-off and, after a certain time has elapsed (at time t2), the clutch C1 is released to start the neutral inertia running mode. The engine 12 is maintained in the idle state associated with accelerator-off. Time t3 is the time when the accelerator operation amount θacc becomes equal to or greater than the first determination value α and the determination of step S9 becomes YES so that the clutch C1 is engaged. As a result the neutral inertia running mode is terminated to return to the normal running mode. Subsequently, the output of the engine 12 is controlled in accordance with the accelerator operation amount θacc as is the case with the normal engine drive running mode.

As described above, the vehicle drive device 10 of this example can perform as the inertia running mode both the neutral inertia running mode performed with the engine 12 allowed to perform the self-sustaining rotation and the free-run inertia running mode performed with the rotation of the engine 12 stopped by stopping the fuel supply and, since the neutral inertia running mode is terminated when the accelerator operation amount θacc becomes equal to or greater than the relatively small first determination value α to promptly return to the normal running mode, the reacceleration performance is acquired as expected by the driver. Particularly, since the return to the normal running mode can be made simply by connecting the clutch C1, this leads to the excellent responsiveness until acquisition of a drive force from engine output, which matches the driver's expectation to reacceleration performance. On the other hand, since the free-run inertia running mode performed with the rotation of the engine 12 stopped is performed until the accelerator operation amount θacc reaches the relatively large second determination value β, the fuel-consumption improving performance is acquired as expected by the driver.

In other words, since the neutral inertia running mode with the engine 12 allowed to perform the self-sustaining rotation is terminated when the accelerator operation amount θacc becomes equal to or greater than the relatively small first determination value α and the free-run inertia running mode with the rotation of the engine 12 stopped is terminated when the accelerator operation amount θacc becomes equal to or greater than the relatively large second determination value β, the driver's expectations to both the reacceleration performance and the fuel-consumption improving performance can be satisfied.

Since the first determination value α and the second determination value β are variably set as depicted in FIG. 4 depending on the road surface gradient Φ and are set to larger values on a down-slope associated with a reduced driver's request for the drive force responsiveness as compared to a flat road, the execution ranges of the free-run inertia running mode and the neutral inertia running mode are expanded, resulting in a longer running distance of the inertia running mode and a further improvement in fuel consumption. Since the determination values are set to smaller values on an up-slope associated with an increased driver's request for the drive force responsiveness as compared to a flat road, a return to the normal running mode is made from the free-run inertia running mode and the neutral inertia running mode at a smaller level of the accelerator operation amount θacc and the drive force from the engine 12 is promptly acquired.

The present invention is not limited to the engine drive vehicle and is also applicable to a hybrid vehicle etc. including an electric motor or a motor generator as a drive force source in addition to the engine 12. The connecting/disconnecting device is not limited to the clutch C1 and may be a device electrically controlling a reaction force to connect and disconnect the power transmission. An automatic transmission including pluralities of clutches and brakes and capable of neutral is also usable. Although the engine is allowed to perform the self-sustaining rotation in the idle state during the neutral inertia running mode in the examples, the engine may not necessarily be in the idle state.

Although the first determination value α and the second determination value β are variably set depending on the road surface gradient Φ in the examples, respective constant values may be defined in advance. In consideration of a vehicle state such as a battery remaining amount, an engine water temperature, and a necessity of an oil pressure, the second determination value β may be made smaller when the battery remaining amount is small, when the engine water temperature is low, or when the necessity of an oil pressure is high, or other various forms are also available. Only one of the first determination value α and the second determination value β may be variable. The variable setting as described above may vary the determination values α and β continuously or in stages including two stages.

Although the examples of the present invention have been described in detail with reference to the drawings, this embodiment is merely an embodiment and the present invention can be implemented in variously modified and improved forms based on the knowledge of those skilled in the art.

NOMENCLATURE OF ELEMENTS

10: vehicle drive device 12: engine 20: wheels 40: accelerator pedal 50: electronic control device 52: normal running means (engine coupling running mode) 54: free-run inertia running means 56: neutral inertia running means 58: running mode switching control means 60: accelerator operation amount sensor C1: clutch (connecting/disconnecting device) θacc: accelerator operation amount α: first determination value β: second determination value

The invention claimed is:

1. A running control device of a vehicle including an engine, an accelerator pedal, and a connecting/disconnecting device connecting/disconnecting the engine and wheels, the running control device of a vehicle being configured to execute
  an engine coupling running mode performed with the engine and the wheels connected by the connecting/disconnecting device,
  a neutral inertia running mode performed with the engine separated from the wheels by the connecting/disconnecting device while the engine is supplied with fuel and allowed to perform self-sustaining rotation, and
  a free-run inertia running mode performed with the engine separated from the wheels by the connecting/disconnecting device while fuel supply to the engine is stopped to stop rotation,
  the neutral inertia running mode being terminated when an operation amount of the accelerator pedal becomes equal to or greater than a predefined first determination value α while the neutral inertia running mode is performed,
  the free-run inertia running mode being terminated when an operation amount of the accelerator pedal becomes equal to or greater than a predefined second determination value β larger than the first determination value α while the free-run inertia running mode is performed.

2. The running control device of a vehicle of claim 1, wherein
  a return to the engine coupling running mode is made when an operation amount of the accelerator pedal becomes equal to or greater than the first determination value α while the neutral inertia running mode is performed, and wherein
  a return to the engine coupling running mode is made when an operation amount of the accelerator pedal becomes equal to or greater than the second determination value β while the free-run inertia running mode is performed.

* * * * *